United States Patent [19]

Maejima et al.

[11] Patent Number: 5,185,873
[45] Date of Patent: Feb. 9, 1993

[54] CONTROL SYSTEM WITH FLAG INDICATING TWO OR LESS DATA INPUTS AND COUNTER INDICATING TWO OR MORE CONTROLLING DATA DRIVEN EXECUTION METHOD

[75] Inventors: Yukihito Maejima, Hachioji; Hirotoshi Shirasu, Yokohama; Taihei Suzuki, Kodaira; Toshiaki Yamamoto, Yokohama, all of Japan

[73] Assignee: Hitachi, Ltd., Tokyo, Japan

[21] Appl. No.: 311,291

[22] Filed: Feb. 16, 1989

[30] Foreign Application Priority Data

Feb. 19, 1988 [JP] Japan .................. 63-36526
May 20, 1988 [JP] Japan .................. 63-121732

[51] Int. Cl.⁵ .................................. G06F 15/82
[52] U.S. Cl. .................................. 395/375; 395/800; 364/DIG. 1; 364/232.22; 364/239.4; 364/263.1; 364/263; 364/262.5; 364/262.4
[58] Field of Search ... 364/200 MS File, 900 MS File; 395/375, 800

[56] References Cited

U.S. PATENT DOCUMENTS 4,901,274 2/1990 Maejima et al. ................ 364/900

FOREIGN PATENT DOCUMENTS 61-23239 1/1986 Japan .
61-123937 6/1986 Japan .

OTHER PUBLICATIONS

Data Flow Control Electronic Exchange Data Flex, Japan, Jun. 1984, Akiyama et al.
"Pratical Dat Flow Computer," IEE Computer Feb. 1982, Waston et al.

Primary Examiner—Thomas C. Lee
Assistant Examiner—L. Donaghue
Attorney, Agent, or Firm—Antonelli, Terry, Stout and Kraus

[57] ABSTRACT

A data driven type instruction execution method for controlling execution of instructions by using a memory storing an input data available source, an output message destination to which the results of the operation performed are sent and an input data number counters for indicating availability of the input data to each of the instructions. A flag indicating the number of input data required for each instruction is not less than two, an input data number counter for the instruction requiring two or more input data and an initialization table for setting an initial value of the counter. The content of the flag is referred and deciding that the instruction can be executed when the flag indicates the input data number of one. The input data counter is decremented when the input data number is two or more, and deciding that the instruction can be executed when the decrement of the input data counter results in zero. Operation is executed starting from the instruction which the input data are complete, the result of the operation being informed to the output message destination. The instruction is registered in the queue when executable. Execution of the instruction is performed by taking out it from the queue.

23 Claims, 10 Drawing Sheets

CONTROL SYSTEM WITH FLAG INDICATING TWO OR LESS DATA INPUTS AND COUNTER INDICATING TWO OR MORE CONTROLLING DATA DRIVEN EXECUTION METHOD

BACKGROUND OF THE INVENTION

The present invention generally relates to a data driven (fired) type instruction execution control method and an apparatus or a system in which the method is adopted. More particularly, the present invention is concerned with a control method for controlling the data driven (fired) type execution of instructions which method can enhance and improve the instruction executing capability or performance as well as the trace efficiency (understandability of program). The invention also concerns a connection processing system by which the above-mentioned method can be adopted.

As language developed for enhancing the productivity of software, there can be mentioned a functional language. With this functional language, the value of a function is definitely determined by the inputted values, and any one function can exert no side effects on other functions and at the same time it is insusceptible to the influences of the other functions. Thus, the functions can be executed independent of one another, making it possible to execute a plurality of processings in parallel. A machine suited for executing programs described with such functional language is generally called a data flow machine. The data drive (firing) concept or principle underlying the data flow machine resides in that execution of any operation can be carried out or fired whenever the operand data required for the operation are completely made available.

As is shown in FIG. 2 of the accompanying drawings, in the operation of the data flow machine, operands (such as data address, data, code and others) are inputted to nodes 1A to 1D represented by blocks in which names of operations (data reading, code conversion, addition and others) are inscribed, wherein each of the nodes outputs the result of the operation as executed. The inputting and outputting to and from the node are represented by arrowhead lines, respectively. The arrowhead line is referred to as the arc, while a data on the arrowhead line is referred to as the token.

Now, it is assumed, by way of example, that a token x has arrived at the left-hand input arc of the addition node 1D. In that case, since the addition can not be performed with the data or token x alone, the latter is set to the stand-by state on that input arc. Upon arrival of a token y at the right-hand input arc of the addition node 1D, the arithmetic operation (addition in this case) is immediately executed, resulting in that a token having a value of $(x+y)$ makes appearance at the output arc of the addition node 1D.

Through similar procedure, calculations can be performed in accordance with other functional expressions such as $x^2 - 2x + 1$ and others.

In the case of the data driven type instruction execution control method known heretofore such as, for example, the method disclosed in JP-A-61-123937, the data required to be rewritten for execution of instructions are contained in one and the same table together with the data which need not be rewritten, wherein the number of the input data arrived at the relevant instruction node is indicated by a rewritable counter. More specifically, in the data driven type instruction execution control system disclosed in the abovementioned publication, tables are prepared in a memory in correspondence to the individual processing program modules, respectively, wherein each table contains input/output data source table identifiers, an input data availability indicator (counter), an output data destination table identifier and an output data storing area for each associated processing program module.

Upon activation, each processing program module consults the associated table to read out the input data from the input data source table indicated by the corresponding table identifier to perform processings on the data in a sequential execution mode, the results of which are written in the predetermined output data storing area of the associated table. Subsequently, the processing program module again refers to the associated table to message the availability or readiness of the relevant input data to the input data availability indicator (counter) of the output data destination table to which the output data resulting from the above processing is to be sent. In the counter mentioned above, the number of the output data from the other program modules is placed as the initial value. An execution control program checks the value of the counter every time the input data becomes available to thereby decrement by "1" the value of that counter when it is not smaller than "2". On the other hand, when the value of the counter is "1", it is decided that all the requisite input data are completely available, whereupon the table for which the data are completely available is registered at the end of a queue. Accordingly, when there are many programs each having the counter value of "1" in the data driven type instruction execution control system described above, it is sufficient to set previously the initial values for only those tables for which the counter value is not smaller than "2". In other words, for the tables whose counters indicate "1", no initialization processing is required, whereby the amount of the initialization processings can be correspondingly reduced.

As the specific features of the data flow program, the following can be mentioned.

(1) Since the sequence in which the instructions are executed is determined on the basis of only the intra-data dependence relation (i.e. input/output relation) and because the program can be expressed in the form of a chart, improved understandability of the program can be assured.

(2) Because the parallel processing can be positively and explicitly expressed, enhancement in the processing capability can be promised by implementing the system in a multiprocessor configuration.

Concerning the queuing of the instructions to be executed according to the data flow program, a discussion is found, for example, in the "Periodical Part-II of The Institution of Electronics And Communication Engineers of Japan", 1984/6, Vol. J67-B, No. 6, pp. 645 to 661. According to the method disclosed in this literature, the system is implemented in a multiprocessor configuration, wherein the instructions are transferred among the processors in the form of packets with a first-in first-out (FIFO) queue being employed with a view to increasing the processing capability in the parallel execution of the instructions.

Further, U.S. patent application Ser. No. 753,852, now U.S. Pat. No. 4,901,274 corresponds to JP-A-61-22329 laid open on Jan. 31, 1986 and also to the above-mentioned JP-A-61-123937.

In the system disclosed in JP-A-61-123937 mentioned above, the counter values are stored in one and the same table regardless of whether the value is one or not less than two. Consequently, upon making decisions as to whether all the input data are available or not, the abovementioned table has to be consulted regardless of whether the counter value is one or not less than two, presenting thus a problem.

Further, initialization of the counters is performed at the time when the program is loaded. Accordingly, the counters have to be initialized to the initial values for all the instructions. This means that the time taken for the initialization of the counters is increased as the number of the instructions becomes greater. Besides, in the prior art system, a rewritable counter, i.e. the table in the form of RAM is employed, as mentioned previously. Consequently, there arises a problem that data can not positively be protected against the destruction upon occurrence of overrunning of the program. To overcome this problem, the data which need not be rewritten may be stored in a read-only memory (ROM) while the data required to be rewritten may be stored in a random access memory (RAM). However, simple division of the data in this way makes it difficult to associate both types of data with each other. In order to realize the linkage between the ROM and the RAM, it is necessary to store in the ROM the addresses of the data stored in the RAM. With this measure, association between both the data can certainly be established. However, in order to access a counter stored in the RAM, the ROM must once be accessed beforehand to thereby extract the address of the counter therefrom, whereupon the RAM is accessed by using the extracted address. This procedure however involves a significant increase in the amount of processing.

As will be understood from the above, the system disclosed in JP-A-61-123937 suffers from two problems to be solved, i.e. prevention of destruction of the table contents stored in the RAM and reduction in the time taken for the initialization of the counters.

On the other hand, the system disclosed in the aforementioned literature pusblished by The Institute of Electronics and Communication Engineers of Japan is the very data flow machine of multi-processor structure. Although the processing capability can be enhanced, a great amount of hardware is required. Besides, difficulty will be encountered in distincting the macroscopical parallel processings and local parallel processings from each other. In other words, the trace efficiency (i.e. understandability of program by a programmer) is degraded.

So far as only the improvement of the understandability is concerned, this can be accomplished by executing the data flow program by an inexpensive conventional on Neumann type processor with the queue being realized by software, although the possibility of processing the instructions in parallel is lost. This system can be implemented by a combination of a processor and a memory. In that case, however, the data drive concept must be emulated, as the result of which a problem arises with regard to the overhead. Further, with only the first-in first-out control of the queue, distinction between the macroscopical parallel processing and the local parallel processing is difficult to another disadvantage. Besides, executions of instructions processed in parallel must be queued. In other words, an instruction to be executed must once be registered in the queue, giving rise to a further problem.

SUMMARY OF THE INVENTION

An object of the present invention is to solve the problems mentioned above by providing a data driven type instruction execution control method which can reduce the time taken for the initialization while protecting the contents of the registered tables and suppressing to a possible minimum the degradation in the processing capability ascribable to the overhead in the data driven type instruction execution control method.

Another object of the present invention is to solve the problems mentioned above by providing a data driven type instruction execution control method which can suppress to a minimum the degradation in the processing capability ascribable to overhead and which can ensure a high efficiency in tracing the instructions (i.e. improved understandability of program).

A further object of the present invention is to provide a connection processing system for an electronic switching system program in which the data driven type instruction execution control method is adopted and in which the abovementioned problems are satisfactorily solved.

In view of the first mentioned object, there is provided according to an aspect of the present invention a data driven type instruction execution control method for controlling execution of instructions by using memory means, in which there are stored in correspondence to each of the instructions an input data available source from which input data are available, an output message destination to which the results of operation performed on the input data are to be sent and an input data number counter for indicating availability of the input data, wherein a flag indicating that the number of the input data required for execution of each instruction is one or not less than two, an input data number counter for two or more input data for the instructions requiring two or more input data for execution thereof and an initialization table for setting an initial value of the counter are stored in the memory means, wherein the data are sequentially taken out from the input data source for the instructions to be executed in accordance with the data drive concept, the content of the flag provided in correspondence with the instruction is referred to, and decision is made that the instruction can be executed when the flag indicates the input data number of one, and wherein the input data counter is decremented by one when the input data number is two or more and decision is made that the instruction can be executed when the decrement of the input data counter results in zero, while deciding that the input data is not yet available when the decrement of the input data counter results in the value of one or more. The operation is executed starting from the instruction for which the input data are completely available, the result of the operation being informed to the output message destination.

Each of the instructions executed according to the data drive concept is provided with a flag indicating whether the number of input data required for executing the instruction is one or not less than two wherein the address of the instruction which requires two or more input data for the execution thereof and the initial value of the counter indicating the input data number are stored in the table or memory area. Thus, when one input data arrives at the instruction to be executed in data driven fashion, the flag in that instruction is referred to, wherein decision is made that the instruction can be executed when the number of the input data required for execution thereof is one, as indicated by the flag. On the other hand, for an instruction which requires two or more input data for the execution thereof, the counter indicating the number of the input data arrived at the instruction (i.e. the number of available input data for the instruction) is decremented by one, whereon decision is made that the instruction can be executed when the result of the decrement shows the value of zero. In contrast, when the decrement by one results in a value of one or more, it is then decided that all the input data required for execution of the instruction are not yet available completely.

Determination as to whether the input data number is one or not less than two can be made at the time when the program is compiled. Accordingly, decision about availability of the requisite input data may be performed only for those instructions which require two or more input data for the execution thereof. Thus, the performance and efficiency in the execution of instructions as a whole can significantly be enhanced. Besides, the value of the flag which needs not be rewritten at the time of execution of the associated instruction can be stored in a ROM and thus protected from destruction of program. Moreover, since the initialization of the counter needs not be performed at the time when the program is loaded but may be carried out immediately before the execution of instruction, the start-up time of the system can be reduced. In the processing for restoring the system from failed state, the initialization of the counter in the instruction can be skipped.

In view of the second mentioned object, there is provided according to another aspect of the invention a data driven type instruction execution control method for controlling execution of instructions by using memory means, wherein input data available sources from which input data are available, output message destinations to which the results of operation performed on the input data are to be sent, data indicating the number of the output message destinations and input data number counters indicating availability of the input data are stored in the memory means in correspondence to the instructions to be executed, respectively. A last-in first-out queue means for queuing the instructions waiting for execution is provided, and the instruction is registered in the queue when the instruction becomes executable. Execution of the instructions are then carried out by taking them out from the queue in last-in first-out fashion.

When the result of operation executed for an instruction is supplied to a succeeding instruction as the input data therefor, the succeeding instruction is immediately executed without being registered in the queue means when the output message destination number of the executed instruction is one and when the succeeding instruction receiving the message informing the availability of the input data is in the state ready for execution.

With the arrangement described above, the instructions executable in parallel in data driven fashion undergo parallel-to-serial conversion by the last-in first-out queue, wherein executions of the instructions are carried out sequentially, i.e. vertically rather than horizontally, whereby the instruction trace can be effectuated efficiently. The instruction for which the number of the output message destination is one can be immediately executed without being registered in the queue, so far as the instruction corresponding to the output message destination is in the state ready for being executed.

DESCRIPTION OF THE PREFERRED EMBODIMENTS

Now, the present invention will be described in conjunction with the preferred and exemplary embodiments thereof.

Figure 2:
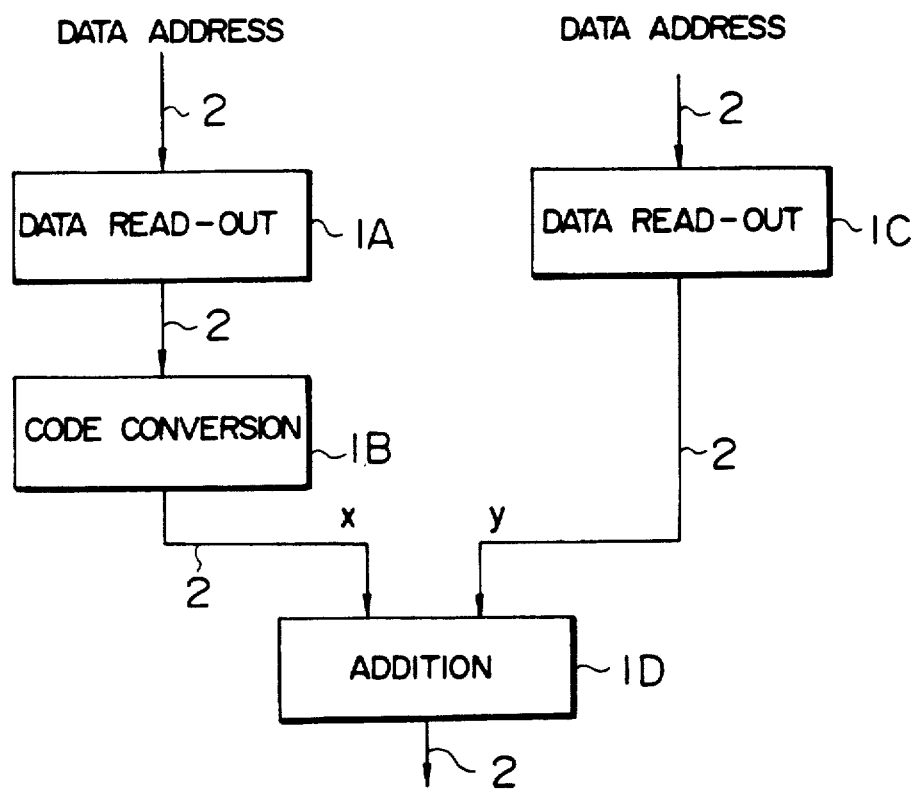
FIGS. 2 and 3 are schematic views for illustrating the concept of data drive instruction execution processing, respectively.
Figure 3:
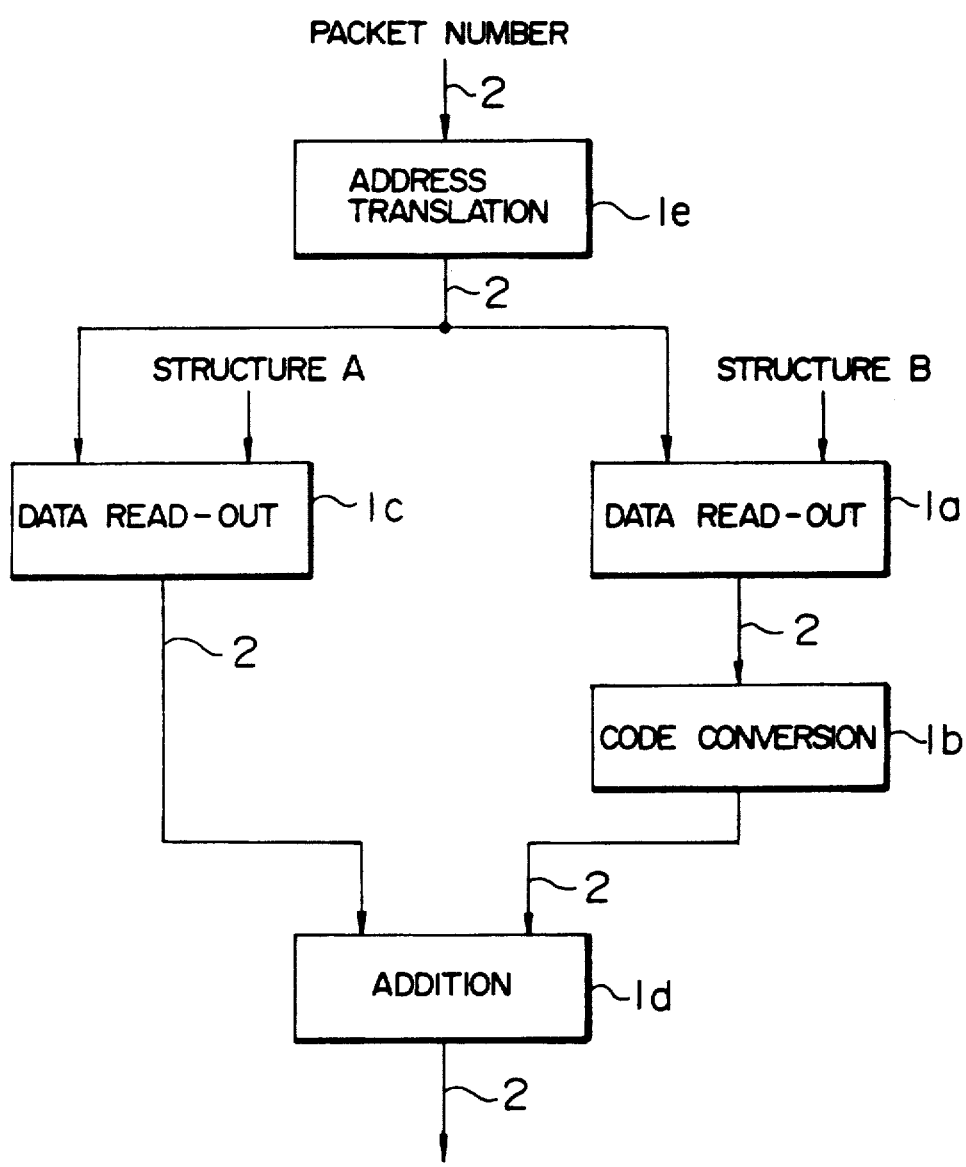

FIG. 3 shows, by way of example, how a data flow (chart) applicable to the present invention can be described. The data flow chart shown in FIG. 3 is basically similar to that shown in FIG. 2 except that an instruction for address translation is added. Referring to FIG. 3, instructions for operations executed as based on the data drive concept are inscribed at the nodes 1a to 1e (generally designated by 1), while the flow paths for the data transferred among the instructions are indicated by the arcs 2. Since the instruction is executed according to the data drive principle, each operation is performed only when all the input data required for the execution of the relevant instruction become completely available or ready.

In the data flow chart shown in FIG. 3, the instructions as illustrated include an instruction 1e for translating a packet number into a packet address, instructions 1c and 1a for reading out in dependence on the packet address indicated by the input data and structure names, respectively, an instruction 1b for converting the code of the input data and an instruction 1d for executing adding operation of two input data. In the operation flow, the packet number as inputted is first translated into the packet address, being followed by the read-out of two data designated by the packet address and the structure names, respectively, wherein one of the data undergoes the code conversion, the result of which is added with the other data as read out.

Figure 4:
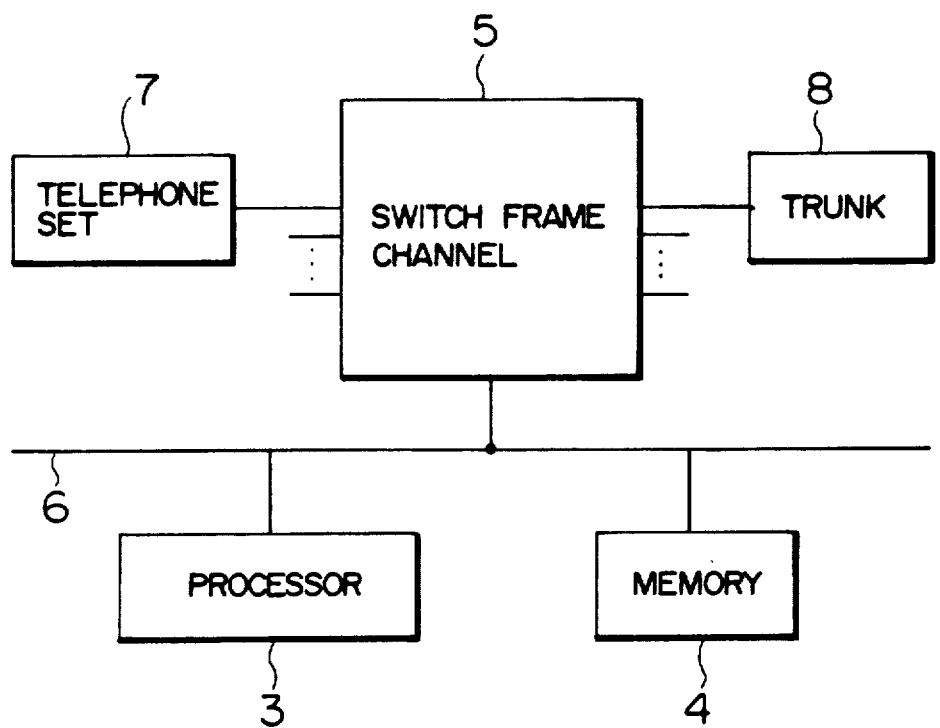
FIG. 4 is a block diagram showing schematically an electronic switching system to which the data flow control concept according to the invention can be applied.

FIG. 4 shows schematically in a block diagram a general arrangement of an electronic exchange or switching system to which the present invention can be applied for executing an electronic switching system program described in the form of a data flow graph according to the teaching of the invention. It should be noted that in the electronic switching (exchange) system, a Neumann-type processor (von Neumann processor) is employed.

More specifically, in the electronic switching system shown in FIG. 4, a Neumann type processor 3 based on the conventional program counter control, a memory 4 imparted with the memory protect function and a space-division type or time-division type switch frame (channel) 5 are interconnected by a processor bus 6. A plurality of telephone sets 7 and trunk equipments 8 are connected to the switch frame 5, although only one is shown for the telephone set and the trunk equipment, respectively.

The electronic switching system program for interconnecting a telephone set 7 and a trunk equipment 8 by way of the switch frame (channel) 5 is described in terms of a data flow graph such as shown in FIG. 3, which program itself is stored in the memory 4. The processor 3 selects a predetermined electronic switching program stored in the memory 4 for a connection request issued by the telephone set 7 or the trunk equipment 8 to thereby execute the selected program according to the data drive principle for thereby establishing the inter-terminal connection between the telephone sets 7 and/or trunk equipment 8 through the switch frame (channel) 5.

Figure 1:
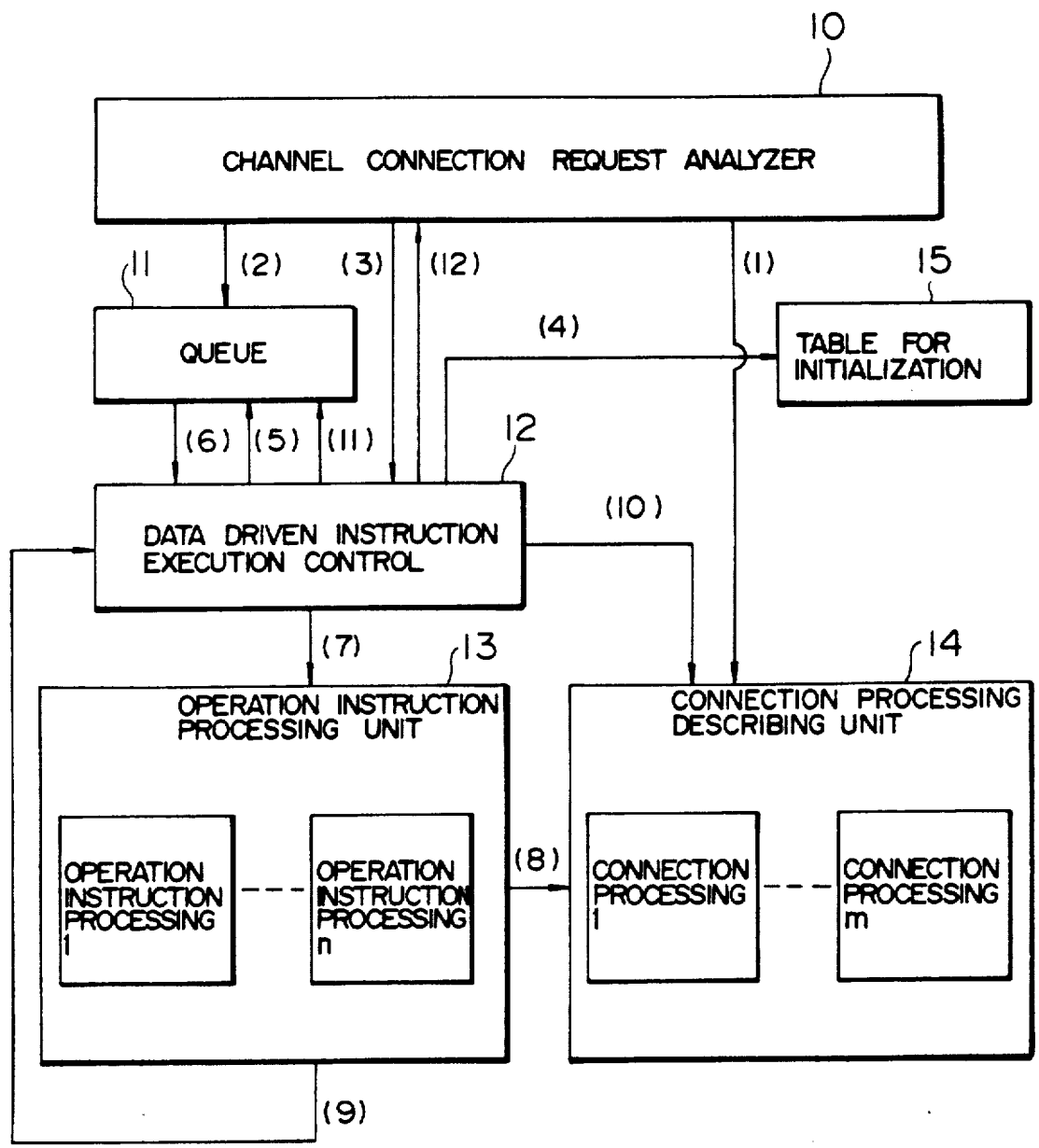
FIG. 1 is a functional block diagram illustrating the data driven type instruction execution control method according to an embodiment of the present invention.

FIG. 1 shows in a functional block diagram of a data driven type instruction execution control system according to an embodiment of the invention and illustrates interconnections among various functional parts constituting the electronic switching program shown in FIG. 4.

Referring to FIG. 1, a numeral 10 denotes a channel connection request analyzer for analyzing a channel connection request issued by the telephone set 7 or the trunk equipment 8 to thereby determine a predetermined channel connecting operation (i.e. select one of connection processing programs 1 to m shown in FIG. 1), a reference numeral 11 denotes a queue of the instructions waiting for execution in the selected program described in terms of a data flow graph, 12 denotes a data driven type instruction execution control unit for executing the instructions of a program expressed in the data flow graph (corresponding to those designated by 1a, 1b, 1c, etc., and also referred to simply as instructions) in accordance with the data drive concept, 13 denotes an operation instruction processing unit for performing operations designated by the names of instructions (and including a plurality of operation instruction processors 1 to n in correspondence with the instruction names, respectively), 14 denotes a connection processing describing unit for a program describing the channel connecting operation in terms of the data flow graph, and a numeral 15 denotes an initialization table containing initial values of counters and an instruction address for initializing the counters indicating the number of input data required for execution of the instruction.

Figure 5:
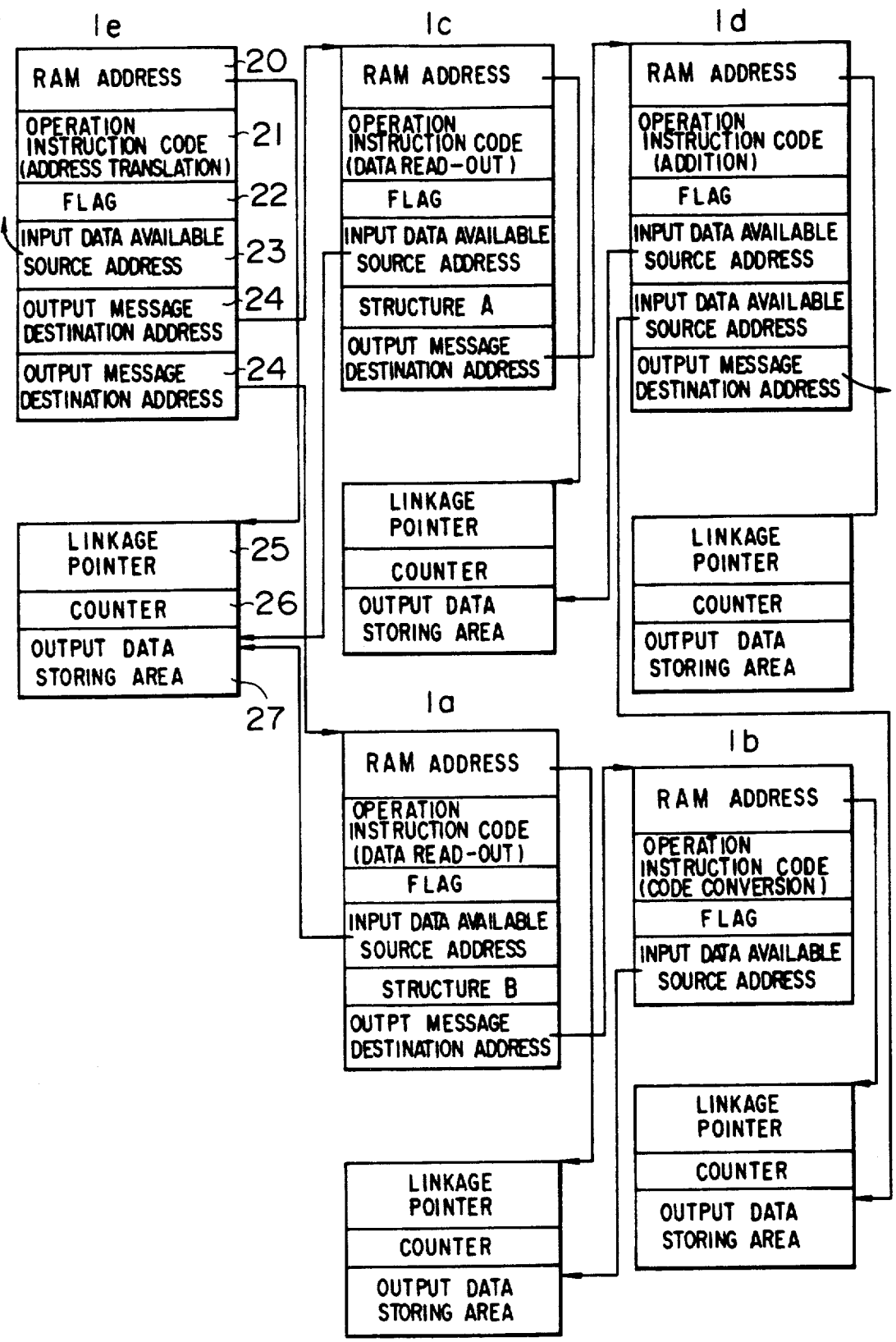
FIG. 5 is a linkage diagram showing memory areas for storing data driven instructions according to another embodiment of the invention.
Figure 6:
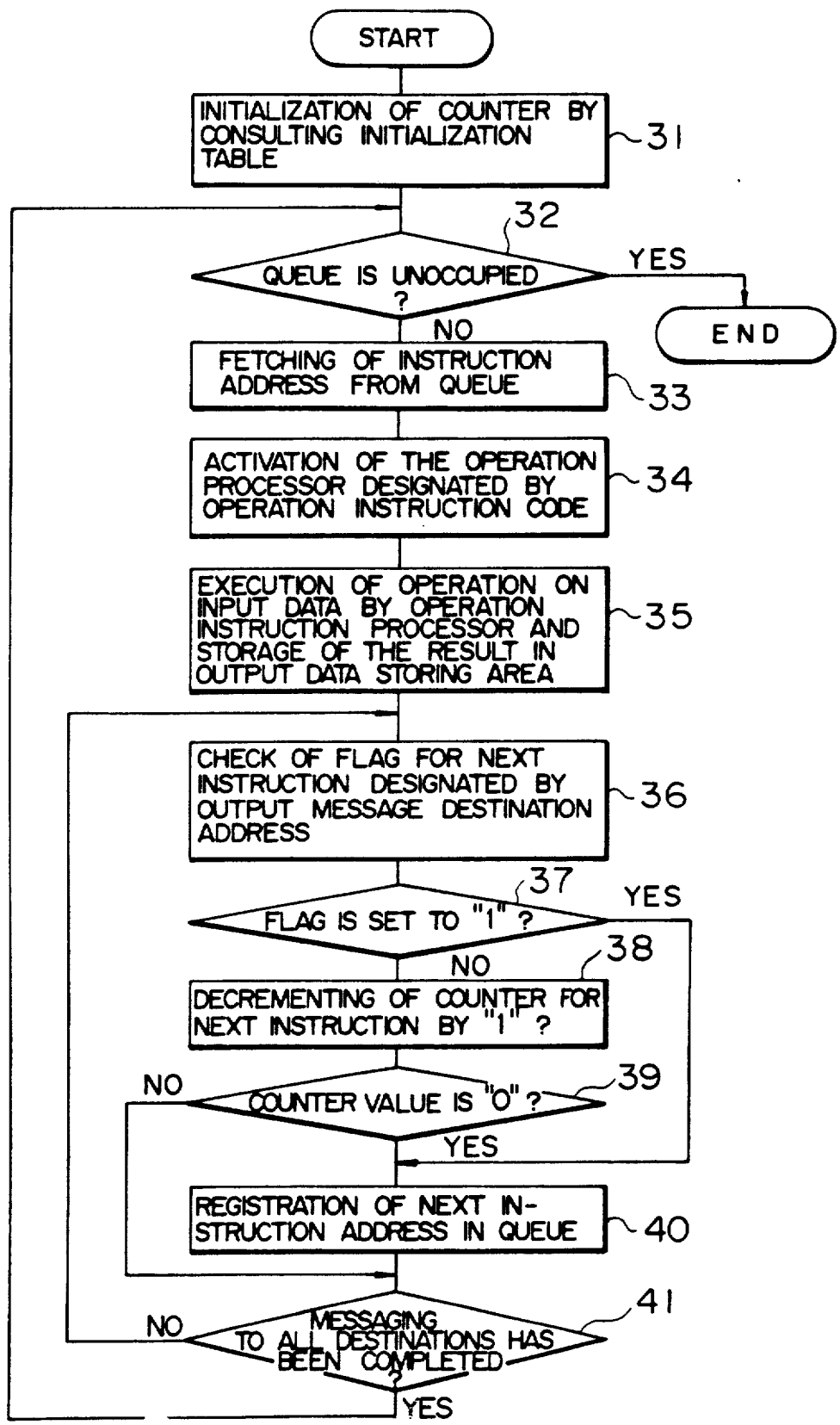
FIG. 6 is a flow chart for illustrating operations of a data driven instruction execution control unit shown in FIG. 1.

FIG. 5 is a view for illustrating, by way of example, a structure of a data driven type instruction adapted to be executed by the system shown in FIG. 1, and FIG. 6 is a flow chart for illustrating the operations of the data driven type instruction execution control unit 12 shown in FIG. 1.

More specifically, FIG. 5 shows an example of interconnection of the instructions 1a, 1b, 1c, 1d and 1e corresponding to one of the connection processing programs 1 to m assigned to the connection processing unit 14 shown in FIG. 1 (i.e., a certain processing program is described with the instructions 1a, 1b, 1c, 1d and 1e). As is shown in FIG. 5, each of the instructions is composed of eight areas 20 to 27. Relation among the instructions 1a, 1b, 1c, 1d and 1e is equivalent to that illustrated in the data flow graph of FIG. 3, wherein the nodes 1a to 1e shown in FIG. 3 correspond, respectively, to the instructions 1a to 1e shown in FIG. 5. Further, arrowheads represent the directed arcs, respectively. In each of the instructions, the area 21 has an operation name written therein. More particularly, the information in the areas 21 of the instructions indicates that the instruction 1e is an address translation instruction, the instructions 1a and 1c are data read instructions, the instruction 1b is a code conversion instruction and the instruction 1d is an addition instruction. Directly written in the nodes are numerical values which are directly inputted to respective nodes and literal data, such as a structure A and a structure B representing the numbers of structures shown in FIG. 5. At this juncture, it should be mentioned that the structure of the individual areas constituting each of the nodes or instructions 1a, 1b, 1c, 1d and 1e are substantially identical with one another except for the areas 21 in which the contents of the operation instruction codes mentioned above are inscribed. Accordingly, only the areas of the node or instruction 1e are designated by corresponding reference numerals, while numerical designations for reference of the areas of the other instructions (nodes) are omitted.

Referring to FIG. 5, a reference numeral 20 denotes an address of a random access memory (RAM) indicating a header of the areas (25 to 27) the contents of which are rewritten upon execution of the instruction, 21 denotes an operation instruction code specifying the instruction processing, 22 denotes a flag indicating whether the number of input data required for execution of the instruction is one or not less than two, 23 denotes an input data available source address for indicating the address of the source from which the input data can be obtained, numeral 24 denotes an output message destination address for messaging to a relevant succeeding instruction that the data output for use thereby is ready or available, numeral 25 denotes a linkage pointer for registering an executable instruction in the queue 11, numeral 26 denotes a counter for indicating the state of arrival (i.e. availability) of the input data required for executing the instruction and numeral 27 denotes an output data storing area for storing the operation results.

For each of the nodes which represents one connection processing, the instruction constituted by the contents of the areas 20 to 27 is stored in the memory 4 (FIG. 4).

The random access memory (RAM) address 20, the operation instruction code 21, the flag 22, the input data available source address 23 and the output message destination address 24 are all determined at the time when the program is compiled. Since these items 20, 21, 22, 23 and 24 are not rewritten at the time of execution of the program, it is possible to validate a memory protecting function for protecting the memorized contents after completion of loading of the program in the memory 4. Alternatively, they may be written in a read-only memory (ROM).

On the other hand, since the linkage pointer 25, the counter 26 and the output data storing area 27 are rewritten upon execution of the instruction, they are stored in the random access memory without memory protection. In this manner, most of the areas of the instruction (i.e. the protected areas) are protected with regard to the contents therein. Thus, even when the program should overrun, the instruction can be protected against destruction to thereby ensure a high reliability.

Next, description will be directed to a method for initialization of the counter 26.

When the number of data required for execution of an instruction is one, the flag 22 is set to the state indicating that the number of input data is one at the time when the program is compiled, as described previously. Accordingly, once the program has been loaded, the initialization of the counter 26 for such instruction for which the number of input data is one is rendered unnecessary.

On the other hand, initialization of the counter 26 for an instruction which requires more than one input data is realized by setting the initial value and the instruction address designated by the initialization table 15 corresponding to a program to be executed, immediately before the execution of the program. Thus, the initialization processing for the counter 26 performed heretofore upon program loading can be omitted, whereby the time taken for the initialization can be reduced.

Now, referring to FIG. 6, description will be made of operation of the system shown in the functional block diagram of FIG. 1 and the memory areas shown in FIG. 5. Parenthetically, the numerals attached to the arcs in FIG. 1 are to indicate the order or sequence in which the processing is transferred.

At first, reference is made to FIGS. 1 and 4. When a connection request or call issued by a terminal such as the telephone set, the trunk equipment or other has arrived at the electronic switching system, the channel connection request analyzer 10 analyzes this connection request to thereby determine one of the connection processings to be executed from the connection processings 1 to m of the connection processing unit 14 (arc (1) in FIG. 1), which is followed by registration of the address of the instruction located at the leading portion of the connection processing in the queue 11 (arc (2) in FIG. 1). The name of the connection processing as registered is then transferred to the data driven type instruction execution control unit 12 for activating the latter (arc (3) in FIG. 1). The data driven type instruction execution control unit 12 thus activated operates in accordance with the processing flow illustrated in FIG. 6.

At first, the initialization table corresponding to the name of the connection processing transferred from the initial tables provided in correspondence with the individual connection processings, respectively, is consulted to thereby initialize all the instruction counters 26 for which the number of the input data required for execution of the instructions is not less than two at a step 31 (arc (4) in FIG. 1). Unless the queue 11 is unoccupied (step 32), the instruction address determined by the leading part of the connection processing and registered by the channel connection request analyzer 10 is extracted from the queue 11 to be subsequently stored (arc (5)), being then followed by a step 33 at which the relevant instruction address is extracted from the queue 11 (arc (6) in FIG. 1) to determine the operation instruction processor 13 indicated by the operation instruction code 21 (FIG. 5) contained in the instruction corresponding to the extracted instruction address. The extracted instruction address is transferred to the determined operation instruction processor 13 (arc (7) in FIG. 1), being followed by the activation of that instruction processor 13 (step 34). The operation instruction processor 13 thus activated obtains the input data from the input data available source address 23 (FIG. 5) contained in the instruction indicated by the extracted instruction address and performs a predetermined operation by using the input data, the result of the operation being stored in the output data storing area 27 linked with the random access memory address 20 (FIG. 5) of the instruction of concern at a step 35 (arc (8) in FIG. 1). Subsequently, the control is transferred back to the data driven instruction execution control unit 12 (arc (9)).

The data driven instruction execution control unit 12 in turn determines the output message destination address 24 (FIG. 5) on the basis of the instruction of the stored instruction address, to issue a message to the output message destination address 24 of a succeeding instruction that the output data of the preceding instruction, i.e. the input data to the succeeding instruction is ready (arc (10) in FIG. 1). This message is effectuated in the manner mentioned below. At first, the flag 22 of the succeeding instruction indicated by the output message destination address 24 (step 36) is checked. When the flag of the succeeding instruction 22 is found to be set to "1", by way of example, at a step 37, it is then decided that the number of the input data required for execution of the instruction is one and that the instruction can be executed, whereupon the address of the succeeding instruction is registered in the queue 11 by using a linkage pointer 25 designated by the random access memory address 20 at a step 40 arc (11) in FIG. 1). On the other hand, when the flag 22 of the succeeding instruction is "0", this means that the number of the input data required for execution of that instruction is not less than two. Accordingly, the counter 26 designated by the random access memory (RAM) address 20 is decremented by one (step 38). In case the counter 26 assumes the value of "0" as the result of the decrement, it is then decided that the instruction of concern can be executed, whereupon the instruction address thereof is registered in the queue 11, as described previously, at a step 40 (arc (11) in FIG. 1). Unless the content of the counter 26 is "0", nothing is done. Further, when there exist a plurality of output message destination addresses 24, the processing described in the foregoing is repeated by a number of times corresponding to the number of the output message destination addresses (steps 36 to 41). When the output data availability has been informed to all the output message destination addresses, the decision processing (step 32) is regained for deciding whether or not the address of the instruction to be executed is registered in the queue 11. When the instruction address has been registered, the instruction execution processing (step 33 to 35) is repeated. On the other hand, if it is found that no instruction address is registered in the queue 11 (step 32), it is then decided that there exists no instruction to be executed, whereupon the data driven instruction execution control unit 12 transfers the control back to the channel connection request analyzer 10 (arc (12)). The connection processing then comes to an end.

Figure 7:
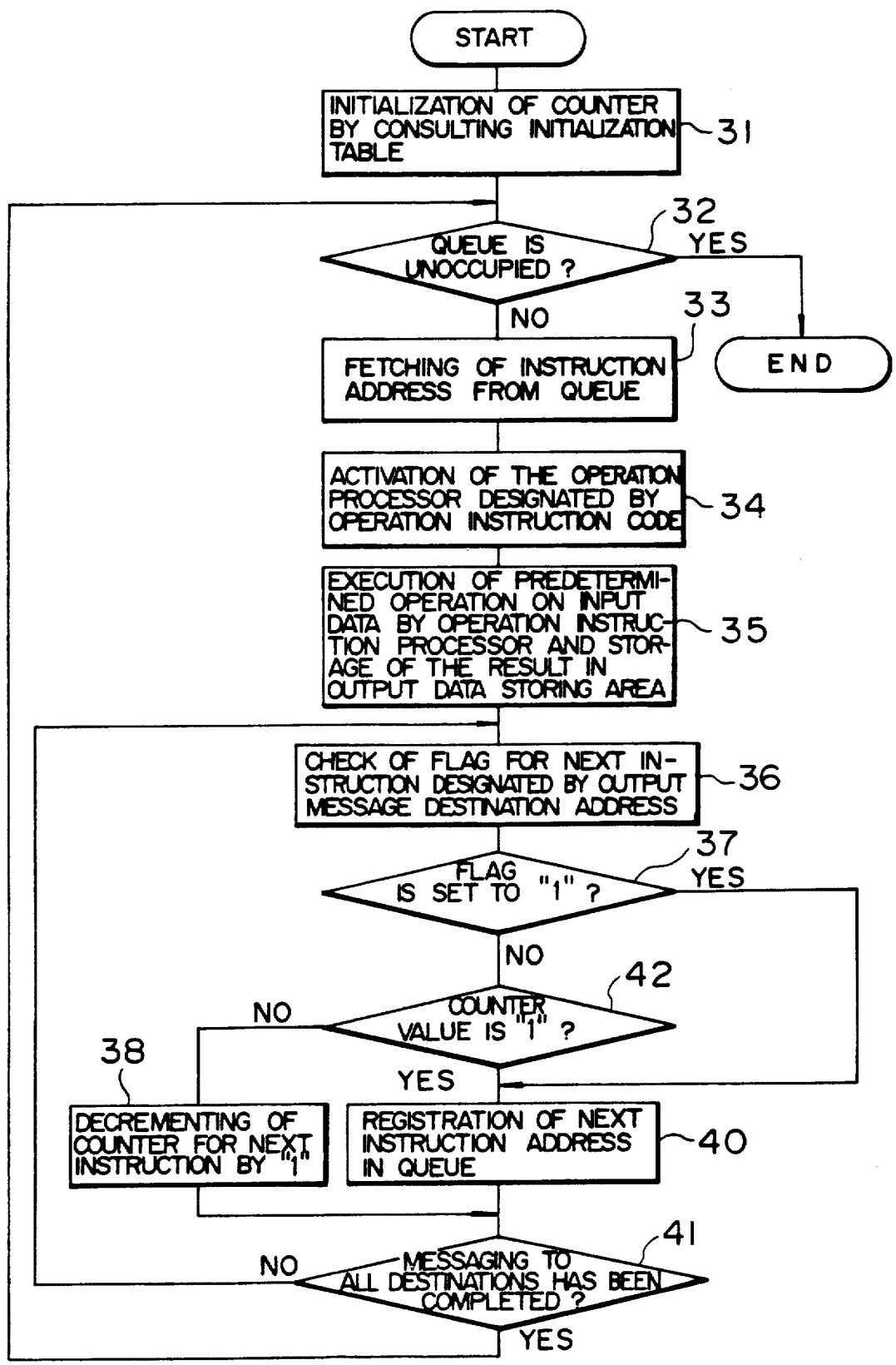
FIG. 7 is a flow chart illustrating operations of a data driven instruction execution control unit according to another embodiment of the invention.

FIG. 7 is a view showing a modification of the processing flow illustrated in FIG. 6. In this conjunction, it should be mentioned that as the method of messaging the readiness (preparation or availability) of the output data, such a procedure may be adopted in which the determination of the value of the counter 26 is first performed, being then followed by the decrement of the counter value. In this case, decision is made that the input data required for execution of an instruction is prepared (in readiness) when the associated counter indicates "1". More specifically, when the flag 22 of the succeeding instruction assumes a value of "0", this means that the number of the input data required for the execution of that instruction is not less than two. Accordingly, it is first decided whether the value of the counter 26 is "1" or not (step 42 in FIG. 7). In case the counter 26 contains "1", it is decided that the input data involved in the instruction execution is ready or available, whereupon the address of the succeeding instruction is registered in the queue 11 (step 40). On the other hand, when the counter 26 holds the value not less than "2", this means that no input data are available at all. Accordingly, the counter 26 is decremented by one (step 38 in FIG. 7). When the flag 22 is set to "1", indicating that the number of the input data involved in the instruction execution is one, the counter decrementing processing can be skipped. Thus, the address of the succeeding instruction is immediately registered in the queue 11.

As will now be understood from the above description of the exemplary embodiments of the invention, the initialization of the counters for indicating the arrival or availability of the input data required for execution of the instructions need not be performed at the time when the program is loaded but may be carried out when the program is executed. Thus, not only the start-up time of the system but also the time taken for restoration processing can significantly be reduced.

According to the illustrated embodiments, the flag indicating whether the number of the input data required for execution of an instruction is "1" or not less than "2" is provided to thereby allow the decision processing for the instruction requiring one input data to be performed efficiently, whereby the system performance concerning the instruction execution can be enhanced. The teachings of the present invention are very effective in executing such a program which includes many instructions requiring only one input data for the execution thereof. Besides, because the flag value is not rewritten upon execution of a program, it may be stored in a read-only memory (ROM) to be thereby protected against destruction.

Figure 8:
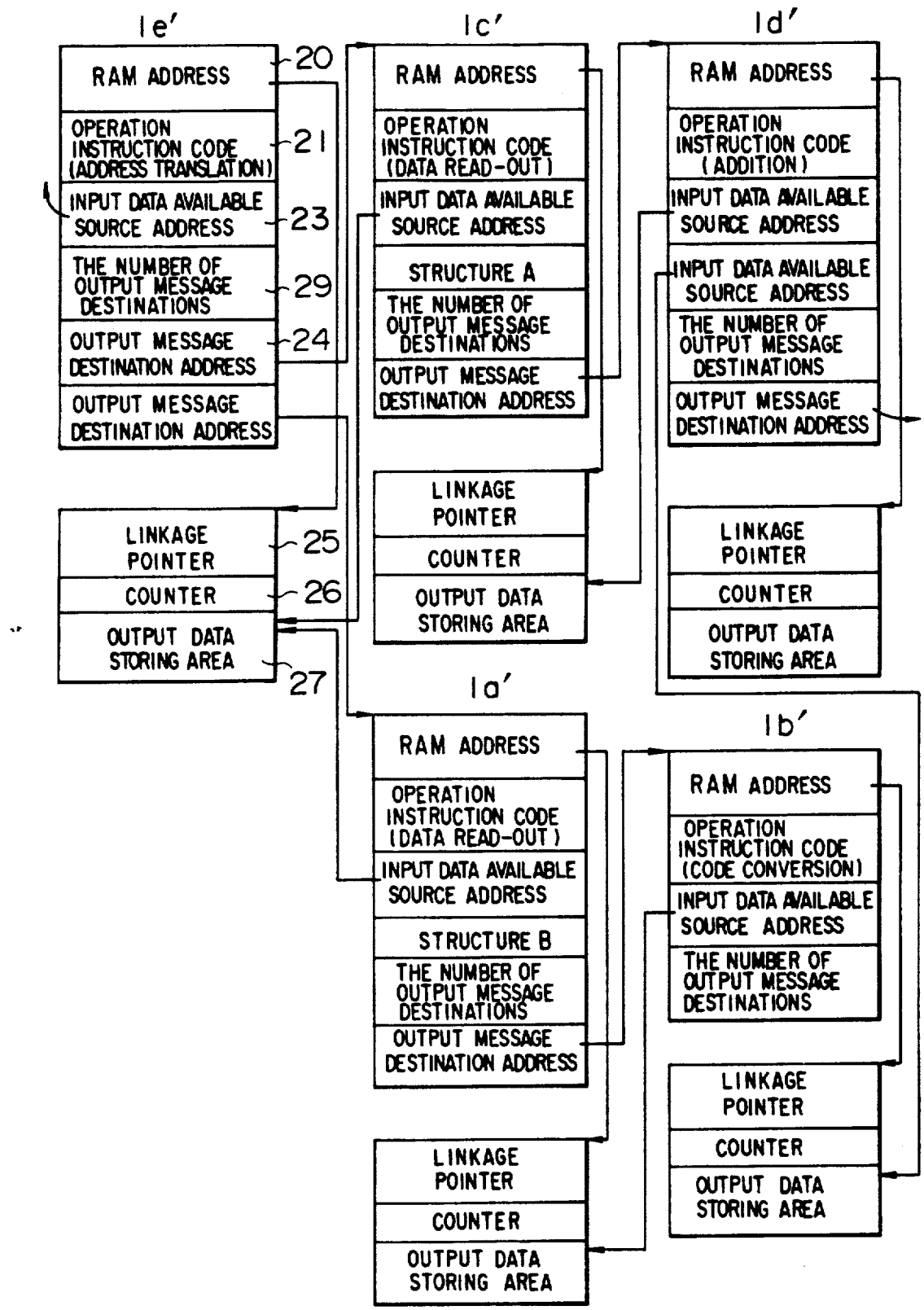
FIG. 8 is a linkage diagram showing memory areas for storing data driven instructions according to a further embodiment of the invention.
Figure 9:
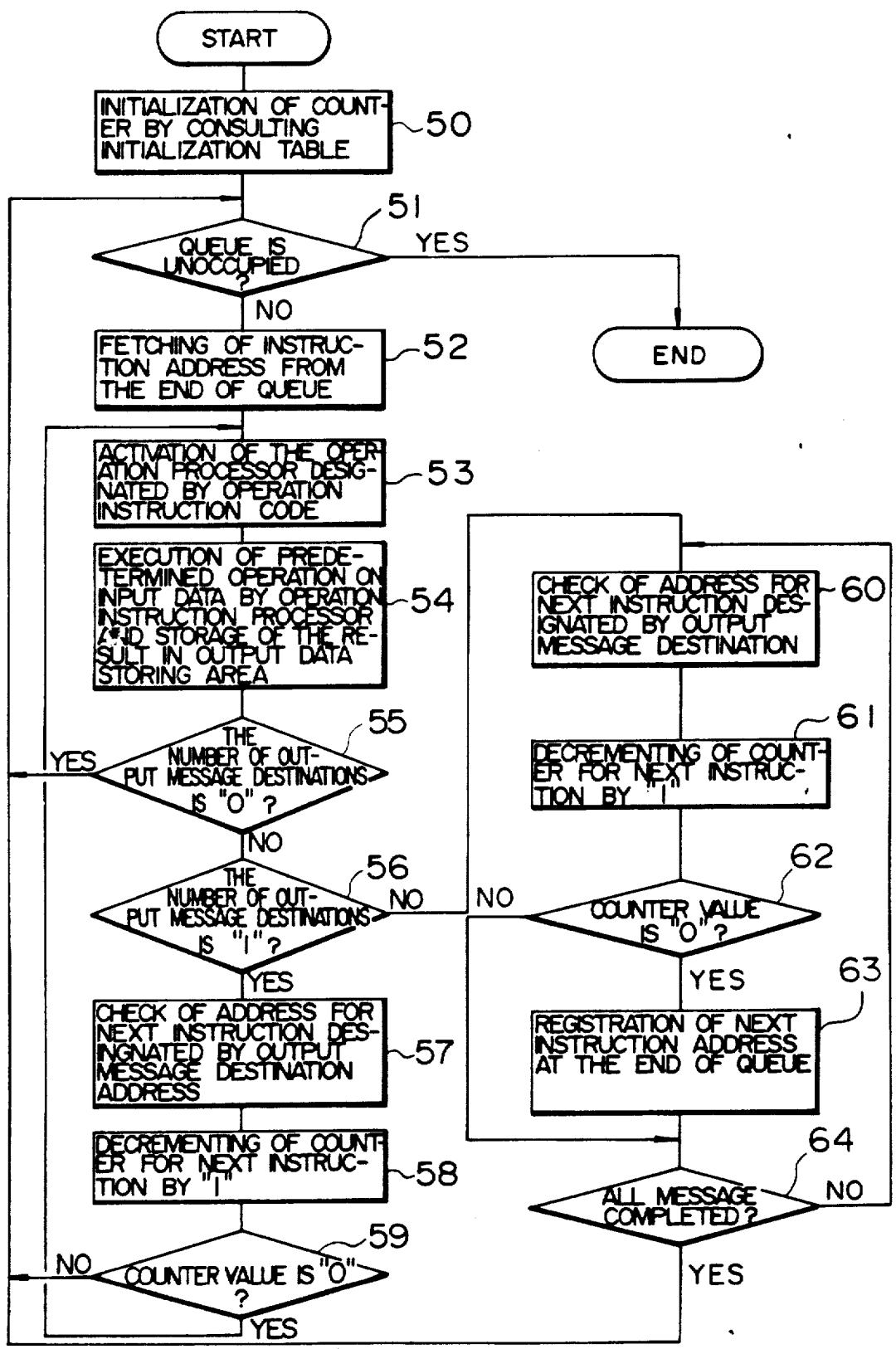
FIG. 9 is a flow chart illustrating operations of the data driven type instruction execution control unit (FIG. 1) according to still another embodiment of the present invention.

FIGS. 8 and 9 are views showing another embodiment of the present invention, in which FIG. 8 illustrates another example of the structure of the data driven instructions executed by the system shown in FIG. 1 and FIG. 8 illustrates in a flow chart the operations performed by the data driven instruction execution control unit of the system shown in FIG. 1 when the instructions of the structure shown in FIG. 8 are executed.

Referring to FIG. 8, reference symbol 1e' denotes an instruction for the address translation, 1c' and 1a' denote the data read-out instructions, respectively, 1b' denotes the code conversion instruction, and 1d' denotes the instruction for the operation of addition.

In FIG. 8, each of the instructions 1a', 1b', 1c', 1d' and 1e' is constituted by eight areas 20, 21, 23, 24, 25, 26, 27 and 29, wherein the areas 20, 21, 23, 24, 25, 26 and 27 are substantially same as those shown in FIG. 5 and denoted by the like reference numerals. Accordingly, description of these areas will be unnecessary. Further, only the individual areas of the instruction 1e' at the corresponding node 1e are identified by attaching the reference symbols, while for the areas of the other instructions at the nodes 1c, 1a, 1b and 1d, the reference symbols are omitted, being understood that the area structure of the instructions at these nodes is substantially identical with that of the instruction 1e' at the node 1e. Difference of the instruction structure shown in FIG. 8 from that of FIG. 5 is seen in that the flag 22 is omitted and that an area 29 for the number of the output message destinations is newly provided.

The number 29 of the output message destinations is determined at the time of compiling a program as with the case of the random access memory (RAM) address 20, the operation instruction code 21, the input data available source address 23 and the output message destination address 24. Since the number 29 of the output message destinations as well as the other contents 20, 21, 23, 25 are not rewritten at the time of executing the relevant program, it is possible to validate the memory protecting function after the program has been loaded in the memory 4.

On the other hand, since the linkage pointer 25, the counter 26 and the output data storage area 27 are rewritten upon execution of the instruction, they are allocated with memory regions susceptible to random access, as described hereinbefore. By virtue of such instruction structure, the contents in most of the areas can be protected against destruction even when the program should overrun, whereby the system reliability can correspondingly be enhanced.

Now, description will be made in detail of the operation of the memory area shown in FIG. 8 by referring to FIG. 9 along with FIGS. 1 and 4.

At first, reference is made to FIGS. 1 and 4. When a connection request issued by a terminal such as the telephone set 7, the trunk equipment 8 or other has arrived at the electronic switching system, the channel connection request analyzer 10 analyzes this connection request to thereby determine one of the connection processings to be executed from the connection processings 1 to m of the connection processing unit 14 (arc (1) in FIG. 1), which is followed by registration of the instruction address located at the starting part of the connection processing in the queue 11 at the end thereof (arc (2) in FIG. 1). The name of the connection processing as registered is then transferred to the data driven instruction execution control unit 12 for activating the latter (arc (3) in FIG. 1). The data driven instruction execution control unit 12 thus activated operates in accordance with the processing flow illustrated in FIG. 9. The operation described above is same as the operation elucidated hereinbefore in conjunction with FIG. 5.

Subsequently, the initialization table 15 corresponding to the name of the connection processing as received is consulted to thereby initialize the instruction counter 26 indicating the number of the input data required for execution of the instruction at a step 50 (arc (4) in FIG. 1). Unless the queue 11 is unoccupied (step 51), the instruction address at the starting portion of the connection processing registered by the channel connection request analyzer 10 is extracted from the queue to be subsequently stored (arc (5) in FIG. 5), being then followed by a step 52 at which the relevant instruction address is taken out from the queue 11 (arc (6) in FIG. 1) to determine the operation instruction processor 13 indicated by the operation instruction code 21 contained in the instruction. The extracted instruction address is transferred to the determined operation instruction processor 13 (arc (7) in FIG. 1), being followed by the activation of that instruction processor 13 (step 53). The operation instruction processor 13 thus activated obtains the input data from the input data available source address 23 contained in the instruction indicated by the extracted instruction address and performs a predetermined operation by using the input data, the result of the operation being stored in the output data storing area 27 linked with the random access memory address 20 of the instruction of concern at a step 54 (arc (8) in FIG. 1). Subsequently, the control is transferred back to the data driven instruction execution control unit 12 (arc (9) in FIG. 1).

Next, the data driven instruction execution control unit 12 determines the number 29 of the output message destinations (instructions or nodes) on the basis of the stored instruction addresses. Unless the output message destination number 29 is "0" (step 55) but "1" (step 56), the output message destination address 24 is determined to thereby inform that the output data, i.e. the input data for the next or succeeding instruction has been prepared availably (ready) (arc (10) in FIG. 1). This messaging is effectuated in the manner mentioned below. At first, the random access memory (RAM) address 20 of the succeeding instruction indicated by the output message destination address 24 is determined, being followed by decrementing by "1" the counter designated by the RAM address at a step 58. When the content of the counter 26 is "0" (step 59), decision is made that the instruction of concern can be executed, whereupon the instruction designated by the instruction address is executed. Unless the counter 26 is "0", nothing is done and the processing for taking out the address of the instruction to be next executed from the end of the queue 11 (step 51) is resumed. In case the output message destination number 29 is greater than one, the addresses of the output message destination nodes are determined (step 60), whereupon the availability of the output data is informed (arc (10) in FIG. 1). This messaging is performed in the manner described hereinbefore. At first, the random access memory (RAM) address 20 of the succeeding instruction designated by the output message destination address is determined, being followed by a step 61 where the counter 26 indicated by the RAM address 20 is decremented by "1" (step 61). When the counter 26 is found to be "0" (step 62), it is decided that the instruction of concern can be executed, whereupon the address of the succeeding instruction is registered in the queue 11 at the end thereof. When there exist a plurality of the output message destination nodes, the routine including the steps 60 to 64 is repeated for a number of times corresponding to that of the output message destination nodes in the manner described above. Upon completion of messaging the output data availability to all the output message destination addresses 24, the processing for taking out the address of the instruction to be next executed from the queue 11 (step 51) is regained. In case it is found that no instruction address is registered at the end of the queue 11 (step 51), decision is made such that there exists no instruction to be executed, whereupon the control is transferred back to the channel connection request analyzer 10 from the data driven instruction execution control unit 123 (arc (12) in FIG. 1). The connection processing thus comes to an end.

Since the sequence of executions of the instruction is such that the parts executable in parallel are not alternately executed but one part executable in parallel is first executed, being followed by execution of other part executable in parallel, by virtue of provision of the last-in first-out queue 11. Thus, the trace of the instructions can be much facilitated.

In a variant of the illustrated embodiments of the invention, the aforementioned flag indicating whether the number of input data required for the execution of the instruction is "1" or not less than "2", may be combined with the last-in first-out queue control. To this end, the flag may be added between the operation instruction code 21 and the input data available source address 23 in the instruction structure.

An example of operation flow for the instruction structure mentioned above is illustrated in FIG. 10. This flow differs from the one shown in FIG. 9 in that processing steps 65 and 66 are newly added.

Figure 10:
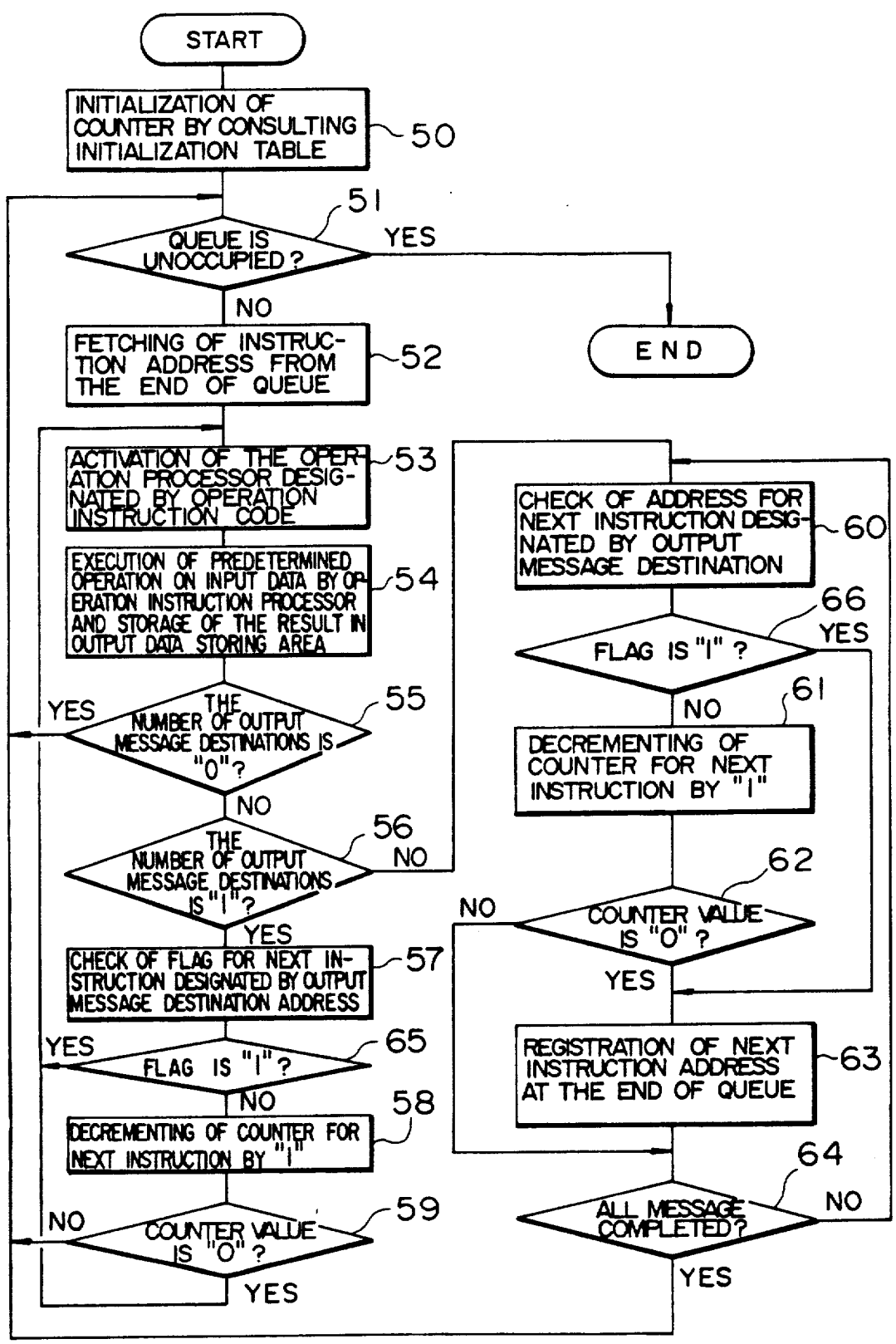
FIG. 10 is a flow chart illustrating operations of the data driven type instruction execution control unit according to yet another embodiment of the invention.

Referring to FIG. 10, when the output message destination number 29 is "1", the address of the succeeding instruction is extracted (step 57). Then, having read the flag in the instruction designated by the instruction address, decision is then made as to whether the flag value is "1" or not (step 65). Assuming, by way of example, that the flag value is "1", it is then decided that the number of the input data required for executing the instruction is "1". Accordingly, the counter decrementing processing is skipped and the instruction can be executed immediately. Thus, the step 53 is regained. On the other hand, when the flag value is "0", it is decided that there exist two or more input data required for execution of the instruction, whereupon the counter of the succeeding instruction is decremented by "1" (step 58).

On the other hand, when the output message destination number 29 is two or more (i.e. when there are two or more output message destination nodes), the address of the succeeding instruction is extracted (step 60), and the flag contained in the instruction indicated by the instruction address is read out, whereupon decision is made as to whether the flag value is "1" or not (step 66). In case the flag is set to "1", it is then decided that the number of the input data required for execution of the instruction "1". In this case, the instruction can immediately be executed since the counter decrementing processing is unnecessary. However, since the number of the output message destination is assumed to be two or more and since there is such a case in which a plurality of instructions can simultaneously be executed, the instruction address is once registered in the last-in first-out queue (step 63). When the flag is set to "0", it is decided that the number of the input data is two or more, whereupon the counter of the succeeding instruction is decremented by "1" (step 61).

The counter decrementing processing and the counter value decision processing (steps 58 and 59; steps 61 and 62) described above by reference to FIGS. 9 and 10 may be replaced by the processing described hereinbefore in conjunction with FIG. 7 in which the decision is first made as to whether the counter value is "1" or not, being followed by the decrement of the counter by "1" unless the counter value is "1", while otherwise the decision is made that the input data required for execution of the instruction are available.

According to the teachings of the invention described in the illustrated embodiment, the queue control can be simplified, when the number of the output message destination number is one and when the output message destination node is in the state ready for immediate execution of instruction, whereby the performance of the data driven instruction execution control system can correspondingly be enhanced. Further, even in the case where a plurality of instructions capable of being executed in parallel exist, the parallel executable parts are not alternately executed but one parallel executable part is first executed with execution of the other part is queued. By virtue of this feature, the efficiency in tracing the instruction can be improved.

We claim:

1. A data driven type instruction execution control method for controlling execution of instructions by using memory means in which an input data available source from which input data are available, an output message destination to which the result of operation performed on the input data are to be sent and an input data number counter for indicating availability of the input data are stored in correspondence to each of the instructions, comprising steps of:

storing in said memory means a flag for each instruction indicating that the number of the input data required for execution of said each instruction is one or more, an input data number counter for each instruction requiring two or more input data and an initialization table for setting an initial value of said input data number counter of said each instruction requiring two or more input data, said flag being stored in a read only area of said memory means;

taking out sequentially data from said input data available source corresponding to an instruction to be executed in data driven fashion;

referring to the content of a flag provided in correspondence with said instruction;

deciding that said instruction can be executed when said flag indicates the input data number is one;

decrementing an input data number counter in correspondence with said instruction by one when said flag indicates the input data number is two or more; and deciding that said instruction can be executed when decrement of said input data counter results in zero, while deciding that the input data is not yet available when decrement of said input data counter results in one or more;

wherein operation is executed starting from the instruction for which the input data are completely available, the result of said operation being messaged to the output message destination.

2. A data driven type instruction execution control method according to claim 1, wherein said initialization table for initializing said input data number counter for said each instruction requiring two or more input data for the execution thereof is placed with the initial value immediately before execution of a relevant program.

3. A data driven type instruction execution control method for controlling sequential execution of instructions by using memory means, wherein input data available sources from which input data are available, output message destinations to which the results of operation preformed on the input data are be sent, data indicating the number of said output message destinations and input data number counters indicating availability of the input data are stored in said memory means in correspondence the instructions be executed, respectively, comprising the steps of:

providing queue means for queuing the instructions waiting execution;

registering the instruction in said queue means when said instruction becomes executable;

executing the instruction by taking it out from said queue means; and, wherein when the result of an operation executed for an instruction is supplied to a succeeding instruction as the input data, said succeeding instruction is immediately executed without being registered in said queue means when the output message destination number of said executed instruction is one and when said succeeding instruction receiving the message informing the availability of the input data for said succeeding instruction is in a state ready for execution.

4. A data driven type instruction execution control method for controlling sequential execution of instructions of a program, wherein addresses of instructions for which input data required for the execution thereof are registered in a queue, said instructions being executed sequentially by taking out said instruction addresses from said queue, comprising the steps of:

preparing flags in correspondence to said instructions, respectively, each flag indicating whether the number of input data required for execution of the associated instruction is one or more;

placing in a counter the number of required input data for an instruction for which two or more input data are required for the execution thereof;

taking out one instruction address from said queue;

executing the instruction indicated by said instruction address taken out from said queue; and deciding on the basis of said flag as to whether the number of the input data required for execution is one or not less than two for each of succeeding instructions to which the result of the execution of said instruction is to be sent, wherein said succeeding instruction is registered in said queue when said input data number is one, while when said input data number is not less than two a decision is made on the basis of the value of said counter as to whether all the input data required for the execution of the succeeding instruction are available or not, wherein said succeeding instruction is registered in said queue when said input data are all available and otherwise said counter is updated to regain said taking out step.

5. A data driven type instruction execution control method according to claim 4, wherein at the step of deciding whether the input data are all available for the execution of said succeeding instruction, said counter is decremented by one and a decision is made that said input data are all available when the decrement of said counter results in zero.

6. A data driven type instruction execution control method according to claim 4, wherein the step for deciding whether the input data are all available for the execution of said succeeding instruction includes a step of making a decision that said input data are all available when the value of said counter is one, and said updating includes a step of decrementing said counter by one.

7. A data driven type instruction execution control method for executing sequentially instructions of a program in such a fashion that the instructions are executed when input data required for the execution thereof are all available, comprising the step of:

registering in a counter the number of the input data involved in the execution for each of instructions of said program;

registering the address of a leading instruction of said program in a queue at the end thereof;

taking out said instruction address from the end of said queue;

executing the instruction designated by said instruction address taken out; and checking the number of succeeding instructions to which the result of execution of said instruction executed is to be sent, regaining said taking out step when said number is zero, while when said number is one, deciding on the basis of the content of said counter as to whether the input data required for execution of the succeeding instruction are all available or not, transferring control back to said executing step for executing said succeeding instruction when said input data are all available, and, if otherwise, transferring control back to said taking out step with said instruction counter being updated, while in case said number of the succeeding instructions is two or more, deciding on the basis of the instruction counter as to whether the input data are all available sequentially for each of said succeeding instructions, to thereby register in said queue at the end thereof the instruction for which the input data are all available and, if otherwise, update said counter, finally transferring the control back to said taking out step.

8. A data driven type instruction execution control method according to claim 7, wherein the step of checking the number of succeeding instructions includes a step of referring to a memory area provided in correspondence to each of the instructions of said program for storing the number of the succeeding instructions.

9. A data driven type instruction execution control method for executing sequentially instructions of a program in such a fashion that the instructions are executed when input data required of the execution thereof are all available, comprising the steps of:

placing the number of input data in an associated counter for each of the instructions of those contained in said program which requires two or more input data for execution thereof;

preparing a flag indicating whether the number of input data is required is one or not less than two for each of the instructions of said program;

registering the address of the leading instruction of said program in a queue at the end thereof;

taking out said instruction address from the end of said queue;

executing the instruction designated by said instruction address taken out from said queue; and checking the number of succeeding instructions to which the result of execution of said instruction executed is to be sent, said taking out step being regained when said number of the succeeding instructions is zero, while when said number of the succeeding instructions is one, the number of the input data for said succeeding instruction is determined on the basis of said flag, wherein the control is transferred back to said executing step for executing said succeeding instruction, while when said number of the input data for the succeeding instruction is two or more, the counter associated with said succeeding instruction is updated with the control being transferred back to said taking out step, and wherein when the number of said succeeding instruction is two or more, the numbers of the input data required for execution of said succeeding instructions are sequentially determined for each of said succeeding instructions on the basis of said flag, wherein the instruction for which the number of the requisite input data is one is registered in said queue at the end thereof, while when said number of the requisite input data is two or more, the associated counter is updated, whereupon the control is finally transferred back to said taking out step.

10. A data driven type instruction execution control method according to claim 9, wherein the step of checking the number of the succeeding instructions includes a step of referring to a memory area provided in correspondence to each of the instructions of said program for storing the number of the succeeding instructions.

11. A data driven type connection processing system for executing an electronic switching system program, comprising:

a channel connection request analyzer connected to at least one terminal;

queue means connected to said registering therein executable instructions capable of being executed;

control means connected to said analyzer and said queue means for controlling execution of the instructions;

connection processing describing means connected to said analyzer and said control means, for describing a plurality of connection processing programs;

operation processing means connected to said control means and each having program modules for executing the instructions of each of said connection processing programs;

a table connected to said analyzer and said control means and provided in correspondence to each of said connection processing programs for holding the number of input data for the instruction which requires two or more input data for the execution thereof;

memory area means provided for each of the instructions for storing a flag indicating whether the number of input data required for execution of the associated instruction is one or not less than two; and counter means provided in correspondence to each of the instructions for placing therein as the initial value the number of input data required for execution of the associated instruction by consulting said table upon execution of the connection processing program;

wherein said analyzer includes means for analyzing the connection request from said terminal and selecting on the basis of the result of the analysis the connection processing program corresponding to said connection request from said connection processing describing means to thereby register in said queue means the address of the leading instruction of said selected connection processing program and activate said control means;

said control means including means for initializing, upon being activated, said counter means by consulting the table corresponding to said selected connection processing program, taking out said instruction address from said queue, determining corresponding operation processing means on the basis of said instruction address as taken out and transferring said instruction address as taken out to said determined operation processing means;

said operation processing means including means for executing the instruction designated by said transferred instruction address with fetched input data required for execution of said instruction; and said control means controlling said connection processing means on the basis of said flag and the number of the input data required for execution of the instruction.

12. A data driven type connection processing system according to claim 11, wherein said control means makes decision for each of all the succeeding instructions to which the result of execution of said instruction is to be sent as to whether the number of input data required for the succeeding instruction is one or not less than two by referring to the associated flag, and the address of the succeeding instruction is registered in said queue when said input data is one in number, while when said input data number is two or more, decision is made by referring to the associated counter as to whether all the requisite input data are available or not, the address of said succeeding instruction being registered in said queue when said requisite input data are all available and, if otherwise, said counter means is so updated as to indicate that the number of the available input data is increased by one, being followed by the extraction of other instruction address from said queue.

13. A data driven type connection processing system according to claim 11, wherein said decision is made such that all the requisite input data are available, when the value of said counter means becomes zero upon decrementing thereof by one.

14. A data driven type connection processing system according to claim 13, wherein said control means determines the number of the succeeding instructions to which the result of execution of said instruction is to be sent by consulting the memory area means associated with said instruction to thereby take out another instruction address from the end of said queue when said number is zero, while making decision by consulting said counter means as to whether all the input data for the succeeding instruction of concern are available or not when said number is one, the address of said succeeding instruction being transferred to said operation processing means to allow said succeeding instruction to be executed when all the input data therefor are available, and, if otherwise, another instruction is taken out from the end of said queue, and when said number of the succeeding instructions is two or more, the counter means associated with said succeeding instructions, respectively, are consulted to thereby deciding whether all the requisite input data are available or not, the counter means associated with the succeeding instruction for which all the requisite input data is unavailable being updated so that the number of the available input data is incremented by one, whereon a further instruction address is taken out from the end of said queue.

15. A data driven type connection processing system according to claim 11, wherein said decision is made such that all the requisite input data are available, when the value of said counter means is two or more.

16. A data driven type connection processing system according to claim 11, wherein said memory area means and said counter means are provided in different memories, respectively.

17. A data driven type connection processing system according to claim 11, wherein said memory area means is provided in a read-only memory, while said counter means is provided in a random access memory.

18. A data driven type connection processing system according to claim 11, wherein said memory area means and said counter means are provided in a same random access memory, said memory area means being imparted with a memory protecting function.

19. A data driven type connection processing system for executing an electronic switching system program, comprising:

a channel connection request analyzer connected to at least one terminal;

queue means connected to said analyzer for registering therein instructions capable of being executed;

control means connected to said analyzer and said queue means for controlling execution of the instructions;

connection processing describing means connected to said analyzer and said control means for describing a plurality of connection processing programs;

operation processing means connected to said control means and each having program modules for executing the instructions of each of said connection processing programs;

a table connected to said analyzer and said control means and provided in correspondence to each of said connection processing programs for holding the number of input data required for execution of each instruction;

memory area means provided for each of the instructions for storing the number of succeeding instructions to which the result of execution of each instruction is to be sent; and counter means which is provided in correspondence to each of the instructions and in which the number of input data required for execution of the associated instruction is written as the initial value by consulting said table upon execution of the connection processing program;

wherein said analyzer includes means for analyzing the connection request from said terminal and selecting on the basis of the result of the analysis the connection processing program corresponding to said connection request from said connection processing describing means to thereby register in said queue at the end thereof the address of the leading instruction of said selected connection processing program and activate said control means;

said control means including means for initializing, upon activation thereof, said counter means by consulting the table corresponding to said selected connection processing program, taking out said instruction address from the end of said queue, determining the corresponding operation processing means on the basis of said instruction address as taken out and transferring said instruction address as taken out to said determined operation processing means;

said operation processing means including means for executing the instruction designated by said transferred instruction address with fetched input data required for execution of said instruction; and said control means controlling said connection processing means on the basis of the number of the succeeding instructions to which the result of execution of each instruction is to be sent and the number of input data required for execution of said instruction.

20. A data driven type connection processing system according to claim 19, wherein the decision is made that all the requisite input data are available when the value of said counter means becomes zero upon decrementing thereof by one.

21. A data driven type connection processing system according to claim 19, wherein the decision is made that all the requisite input data are available when the value of said counter means is one, while the value of said counter means is decremented by one through said updating when the value of said counter means is two or more.

22. A data driven type connection processing system for executing an electronic switching system program, comprising:

a channel connection request analyzer connected to at least one terminal;

queue connected to said analyzer for registering therein instructions capable of being executed;

control means connected to said analyzer and said queue means for controlling execution of the instructions;

connection processing describing means connected to said analyzer and said control means, for describing a plurality of connection processing programs;

operation processing means connected to said control means and each having program modules for executing the instructions of each of said connection processing programs;

a table connected to said analyzer and said control means and provided in correspondence to each of said connection processing programs for holding the number of input data for the instruction which requires two or more input data for the execution thereof;

first memory area means provided for each of the instructions for storing a flag indicating whether the number of input data required for execution of the associated instruction is one or not less than two;

second area means provided in correspondence to each of the instructions for storing the number of succeeding instructions to which the result of execution of the associated instruction is to be sent; and counter means provided in correspondence to each of the instructions for placing therein as the initial value the number of input data required for execution of the associated instruction by consulting said table upon execution of the connection processing program;

wherein said analyzer includes means for analyzing the connection request from said terminal and selecting on the basis of the result of the analysis the connection processing program corresponding to said connection request from said connection processing describing means to thereby register in said queue at the end thereof the address of the leading instruction of said selected connection processing program and activate said control means;

said control means including means for initializing, upon activation thereof, said counter means by consulting the table corresponding to said selected connection processing program, taking out said instruction address from the end of said queue, determining the corresponding operation processing means on the basis of said instruction address as taken out and transferring said instruction address as taken out to said determined operation processing means;

said operation processing means including means for executing the instruction designated by said transferred instruction address with fetched input data required for execution of said instruction; and said control means controlling said connection processing means on the basis of said flags, the number of the succeeding instructions to which the result of execution of each instruction is to be sent and the number of input data required for execution of each instruction.

23. A data driven type connection processing system according to claim 22, wherein said control means determines the number of the succeeding instructions to which said result of execution of the instruction is to be sent by consulting the second memory area associated with said instruction to thereby take out another instruction address from the end of said queue when said number of said succeeding instruction is zero, while making decision by consulting said flag as to whether the input data for the instruction of concern is one or not less than two when said number of the succeeding instruction is zero, whereon the address of said instruction of concern is transferred to said operation processing means for execution thereof when said input data number is one while making decision by consulting the associated counter means whether all the input data required for executing the instruction of concern are available when said input data number is two or more, whereon the address of said instruction is transferred to said operation processing means when said input data are all available and, if otherwise, said associated counter is so updated that the number of the available input data is incremented by one, being followed by taking out of another instruction from said queue, while when said number of said succeeding instruction is two or more, the flag provided in association with each succeeding instruction is consulted to determine the requisite input data number, whereon the succeeding instruction for which the requisite data number is one is registered in said queue at the end thereof, while for the succeeding instruction which requires two or more input data, the associated counter means is consulted to decide whether all the requisite input data are available or not, whereon the address of the succeeding instruction is registered at the end of said queue when said requisite input data are all available, and, if otherwise, said associated counter is updated such that the number of the available input data is incremented by one, being then followed by taking out another instruction from the end of said queue.

* * * * *